United States Patent [19]

Goad

[11] Patent Number: 5,269,217
[45] Date of Patent: Dec. 14, 1993

[54] FOOD WARMING VESSEL FOR CAFETERIAS, RESTAURANTS AND THE LIKE
[75] Inventor: Eugine W. Goad, Dayton, Minn.
[73] Assignee: Industrial Design and Engineering Associates, Inc., Rogers, Minn.
[21] Appl. No.: 992,837
[22] Filed: Dec. 18, 1992

Related U.S. Application Data

[63] Continuation-in-part of Ser. No. 693,459, Apr. 29, 1991, Pat. No. 5,203,257.
[51] Int. Cl.$^5$ ............................................... F24B 9/00
[52] U.S. Cl. ..................................... 99/483; 99/403; 126/33; 126/377; 126/369; 219/437; 219/523; 219/433; 392/441; 392/447
[58] Field of Search ............... 99/483, 447, 401, 413, 99/415, 417, 331, 467, 468, 330; 126/369, 33, 377, 378; 219/432, 433, 437, 523; 392/441, 444, 445, 447, 485

[56] References Cited

U.S. PATENT DOCUMENTS

| | | | |
|---|---|---|---|
| 1,939,715 | 12/1933 | Meitzler | 126/33 |
| 2,202,320 | 5/1940 | Sacerdote | 126/376 |
| 2,236,837 | 4/1941 | Rimmel | 219/425 |
| 2,435,981 | 2/1948 | Rawson | 392/447 |
| 2,453,425 | 11/1948 | Freed | 219/433 |
| 2,731,539 | 1/1956 | Pavelka, Jr. | 126/33 |
| 2,756,425 | 7/1956 | Webber | 126/378 |
| 3,130,288 | 4/1964 | Monaco et al. | 126/369 |
| 3,288,054 | 11/1966 | Weprin et al. | 99/447 |
| 3,748,439 | 7/1973 | Ting et al. | 219/523 |
| 3,760,147 | 9/1973 | Tyrey | 392/485 |
| 3,892,945 | 7/1975 | Lerner | 219/432 |
| 4,215,267 | 7/1980 | Kaebitzsch | 219/439 |
| 4,246,955 | 1/1981 | Skala | 99/330 |
| 4,284,880 | 8/1981 | Keiser | 219/145 |
| 4,480,174 | 10/1984 | Hummel | 219/523 |
| 4,731,251 | 3/1988 | Jovanovic | 426/243 |
| 4,779,605 | 10/1988 | Smith et al. | 126/33 |
| 4,797,536 | 1/1989 | Handley | 392/444 |
| 5,045,672 | 9/1991 | Scott | 219/439 |
| 5,119,800 | 6/1992 | Roberts et al. | 126/377 |

FOREIGN PATENT DOCUMENTS 2198631  6/1988  United Kingdom .

OTHER PUBLICATIONS

*Parts List:* "Soup 'r Chef, Model TW-665", IDEA Medalie Division; Rogers, Minn., Oct. 1, 1989.
*Parts List:* "Model 4, 7 & 11 Food Warmer", IDEA Medalie Division, Rogers, Minn.; May 1, 1990.
*Parts List:* "Model 2000 & 2001 Food Warmer"; IDEA Medalie Division, Rogers, Minn.; Aug. 1, 1987.
*Parts List:* "Food or Topping Warmer Model TW-24"; IDEA Medalie Division, Rogers Minn.; Jan. 1, 1991.
*Parts List:* "Soup'r Cooker Model 6105 & 685"; IDEA Medalic Division, Rogers, Minn.; Sep. 1, 1990.
*Parts List:* "Magnum Model 6125"; IDEA Medalie Division, Rogers, Minn.; May 1, 1990.
*Parts List:* "Colonial Kettle TM Model 1776 & 1777"; IDEA Medalie Division, Rogers, Minn.; Jun. 1, 1990.
*Parts List:* "DECO Hot Shot TM "; IDEA Medalie Division, Rogers, Minn.; Sep. 1, 1988.
*Parts List:* "Model 260 Food Warmer"; IDEA Medalie Division, Rogers, Minn.; May 1, 1990.
*Parts List:* "DECO Food Warmer Model 1925"; IDEA Medalie Division, Rogers, Minn.; May 1, 1988.
*Product Sheet:* IDEA Foodservice Equipment Product Sheet; IDEA Medalie Division, Rogers, Minn., date unknown.

*Primary Examiner*—Timothy F. Simone
*Attorney, Agent, or Firm*—James V. Harmon

[57] ABSTRACT

A food warmer is provided which includes a metal food tray having side and bottom walls and a mouth at the top opening upwardly. A hollow well or sump vessel is provided around the food tray. The sump vessel is formed from a highly filled thermosetting plastic resin to provide a rigid monolithic body comprising at least about 15% and preferably about 30% to 80% by weight of an inert mineral filler, e.g. calcium carbonate ($CaCO_3$) and fiberglass, and about 20% to 50% by weight of a thermosetting plastic resin so that the thermal conductivity of the food tray is at least about 50 times greater than that of the sump vessel. The sump vessel has bottom and side walls that enclose the sides and bottom of the food tray and is adapted to hold liquid, specifically water, as a heat transfer medium. An electric heating element is supported from a wall of the sump vessel between the walls of the sump vessel and the food tray for heating the food when energized.

12 Claims, 3 Drawing Sheets

FOOD WARMING VESSEL FOR CAFETERIAS, RESTAURANTS AND THE LIKE

This is a continuation-in-part of my prior application Ser. No. 07/693,459, filed Apr. 29, 1991, now U.S. Pat. No. 5,203,257 and bearing the same title.

FIELD OF THE INVENTION

The invention relates to food warmers and more particularly to food warmers that are suited for institutional use, e.g. in cafeterias and restaurants.

BACKGROUND OF THE INVENTION

Restaurants and institutions commonly hold and serve hot foods from electrically operated countertop food warmers. Water is usually, but not necessarily, used in the wells of the warmer to act as a heat transfer medium and to improve thermal efficiency. These warmers are designed to hold 12"×20" steamtable pans or combinations of fractionally sized pans in various depths with the use of an adaptor plate formed from a sheet of metal with one or more openings. These warmers may also be used to hold a variety of round shouldered vegetable pans or inserts. The rectangular vegetable pans or inserts are supported by a lip which extends outwardly at the top of the pan and rests on the top edge of the warmer well. In addition to support, the lip acts as a loose seal to prevent the escape of large amounts of steam from the area between the bottom of the well and the bottom of the pan. Like the rectangular pans, the adaptor plates also have lips and flanges to provide support and act as a steam seal.

The arrangement commonly employed for use in restaurants and cafeterias prior to the present invention is exemplified by U.S. Pat. No. 4,284,880 in which food is held in a metal pan surrounded by an insulated housing which includes a pair of spaced apart metal walls between which is stuffed fiberglass insulation. An electrical heating element provided in the unit is not exposed to the metal food tray but is instead mounted below a metal plate which is itself spaced a few inches below the food tray. U.S. Pat. No. 4,215,267 is similar except that the electrical heater is mounted below a heavy heat distribution plate. Heat is not transmitted efficiently to the food tray in these devices because the electric heater is in physical contact with the housing and is not facing, i.e. exposed directly to, the food tray. Moreover, the double-walled housing filled with insulation is expensive, time consuming to assemble, and presents an undesirable environmental impact. U.S. Pat. No. 5,045,672 is generally similar except that the water pan which consists of a single thickness of sheet metal will suffer from substantial heat losses, defeating a primary objective of the invention which is to provide excellent thermal efficiency while at the same time eliminating the need for an expensive insulation-filled metal housing.

U.S. Pat. No. 3,130,288 discloses a food service device which includes a deep outer pan containing a water bath and an inner tray for holding food. Both the tray and the pan are formed from transparent plastic sheet material such as a thermoplastic (Lucite or Plexiglass) or a thermosetting material An electric heating element is placed in contact with the inside of the pan. This device has several shortcomings. First, the electric heater can cause localized overheating and damage to the material from which the pan is formed. More importantly, because both the food tray and the water bath pan are formed from plastic material, they are both heat insulators. Consequently, heat is not transmitted efficiently to the food. Finally, much infrared radiation will escape through the transparent plastic walls of the unit.

In view of these and other deficiencies of the prior art, it is one object of the invention to provide an improved food warmer for restaurants, cafeterias and the like in which heat loss is minimized and the requirement for an expensive fiberglass-filled sheetmetal housing is eliminated while at the same time enabling heat to be conducted very efficiently from the electric heating element to the food within the food tray.

Another object of the invention is to provide a food warming device for cafeterias, restaurants and the like having a rigid monolithic sump vessel of a composition which provides excellent strength and impact resistance, outstanding heat insulating qualities and is not subject to stress cracking or other damage after repeated cycles of exposure to boiling water over a period of many months or years of use.

These and other more detailed and specific objects of the present invention will be apparent in view of the following description setting forth by way of example but a few of the various forms of the invention that will be apparent to those skilled in the art once the principles described herein are understood.

SUMMARY OF THE INVENTION

In accordance with the present invention, a food warming device is provided for restaurants, cafeterias and the like which includes an upper food containment vessel or food tray having side and bottom walls and a wide mouth positioned to open upwardly together with a lower sump vessel in which the food tray is placed during use. The sump vessel can contain a heat transfer fluid such as water. Below the surface of the water when water is present is an electric heating element positioned in spaced relationship above the bottom and side walls of the sump vessel and a short distance below the bottom of the food tray.

In accordance with the present invention, several important features interact to achieve satisfactory operation. First a particular ratio is established between the thermal conductivity $K^1$ of the food pan and the thermal conductivity $K^2$ of the sump vessel. It is preferred that the ratio $K^1/K^2$ be at least 50 and most preferably at least about 100. In other words, the thermal conductivity of the food pan should be at least about 50 times and preferably at least about 100 times greater than that of the sump vessel. It was found that this can be accomplished by forming the food tray from a heat conductive metal such as stainless steel or aluminum and the sump vessel from a rigid, monolithic thermosetting plastic resinous body containing a relatively high content (over 15% by weight) of chemically inert particulate mineral filler material The most preferred fillers are metal silicates, metal oxides and/or metal carbonates. It is preferred that the inert mineral filler comprise at least about 15% by weight of the vessel and preferably from about 30% to about 80% by weight of the vessel. The balance, typically from about 20% to about 50% by weight of the vessel, is a thermosetting plastic resin in which the filler is uniformly distributed. The particulate filler material can consist either of powdered material or fibers such as glass fibers, but is preferably a mixture of both.

During fabrication, the resin is cured, i.e. sets up hard, to form a monolithic rigid sump vessel structure containing the inert mineral filler particles. After it has cured, the resin is irreversibly converted to a rigid material that will not return to its former plastic condition but instead will char when exposed to high heat. The resin is relatively heavily loaded with the inert mineral filler particles.

In one typical application of the invention utilizing polyester resin that is cured with a peroxide type catalyst, the ratio of filler to resin is about 3 to 1 parts by weight. Thus, there is about three times as much filler as resin. The sump vessel has excellent heat insulating qualities, good strength, excellent impact resistance and a high dielectric constant. All quantities herein are expressed as percent or parts by weight.

The thermal conductivity $K^2$ of the sump vessel is preferably in the range of about 0.5–3.0 BTU/hr/sq ft/degree F./inch thickness. In one typical example of the invention, the thermal conductivity value $K^2$ of the sump vessel was about 1.3 BTU/hr/sq ft/degree F./inch thickness. If the food pan is formed from aluminum, the thermal conductivity ratio $K^1/K^2$ is about 1,000. However, if the food pan is formed from stainless steel, $K^1/K^2$ is about 240. By having $K^1/K^2$ be at least 50, the sump vessel will provide excellent heat insulating qualities and the heat produced by the heating element will be readily transmitted through the food pan to the food.

THE FIGURES

DETAILED DESCRIPTION OF THE INVENTION

Figure 1:
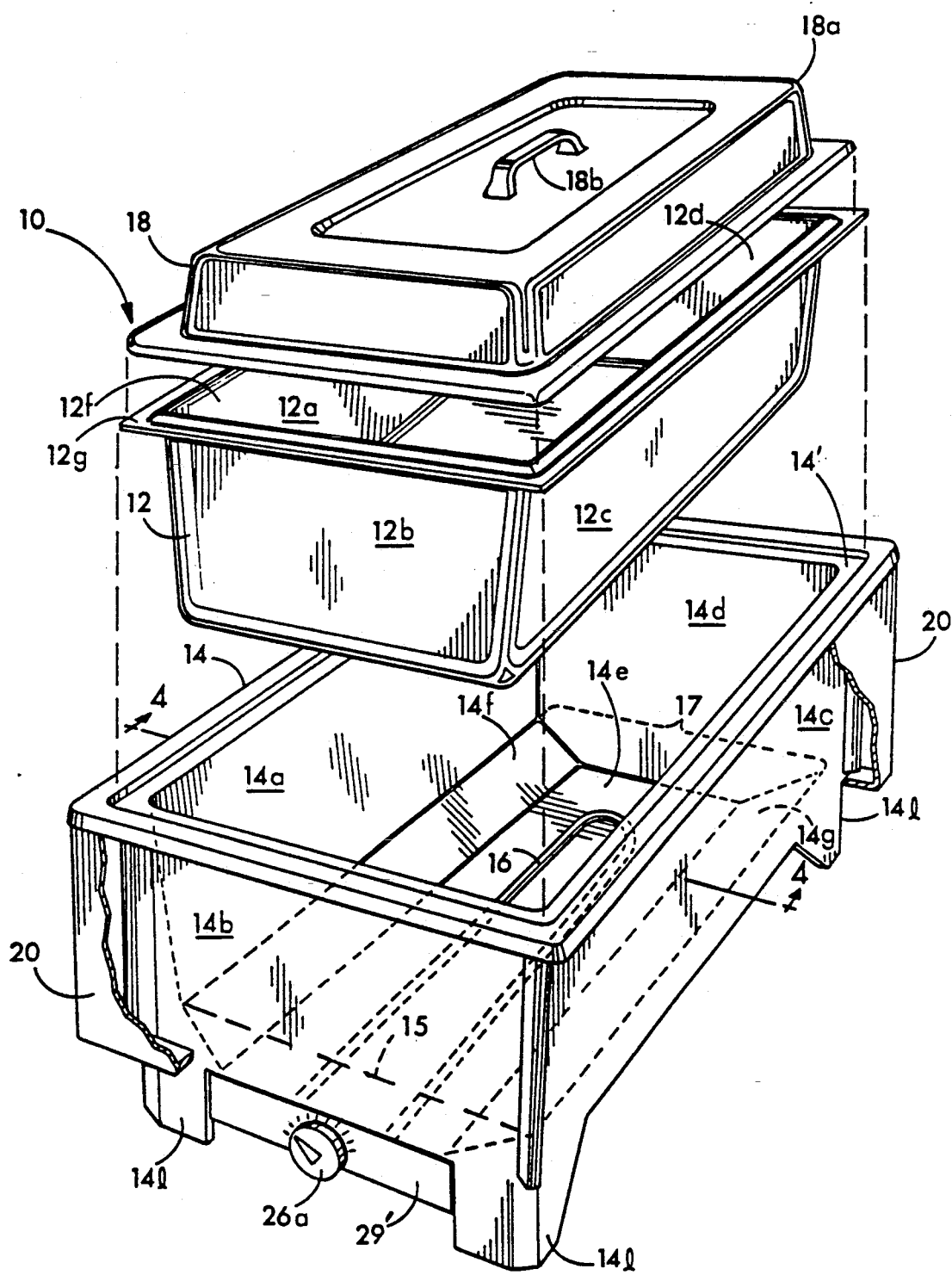
FIG. 1 is an exploded perspective view of the invention.

The main components of the food warmer 10 are the following: a food containment vessel or food tray 12 which fits inside a well or sump vessel 14, an electrical resistance heater 16 and optionally a cover 18 and housing 20. The warming vessel can be made in a round, oval or rectangular cross-section as illustrated.

The food containing pan or tray 12 is formed from a good conductor of heat such as metal, the most preferred being aluminum or stainless steel. While the tray 12 can be formed by casting, stamped sheet metal is preferred. If the pan 12 is formed from aluminum, it can have a thickness of about 0.025 to 0.05 inch, or if made of stainless steel about 18 gauge to 22 gauge, i.e. about 0.029 to 0.049 inch thick. The conductivity value $K^1$ of the pan 12 will be about 0.5 cal-cm/sec-cm$^2$C.° for aluminum and about 0.12 cal-cm/sec-cm$^2$C.° for stainless steel or expressed in BTU-in/hr-ft$^2$-F.° units, about 1300 BTU-in/hr-ft$^2$-F° and 315 BTU-in/hr-ft$^2$-F.°, respectively. If desired, the pan 12 can have a black coating on its lower surface, e.g. a black oxide coating, to promote heat absorption.

The pan 12 includes four upright side walls 12a–12d which preferably taper outwardly, a flat bottom wall 12e and a wide mouth 12f which opens upwardly. At the upper edge of the side walls 12a–12d is a laterally extending supporting flange or rim 12g which, during use, rests in a notch or recess 14' of the sump vessel 14. The notch 14' is molded into the upper surface of the lip 13 at the upper edge of the sump vessel 14 to help direct the flow of condensed vapor back into the sump vessel 14. This helps to prevent the loss of heat and moisture. The cover 18 includes a downwardly directed lower peripheral edge 18a which rests on the flange 12g. The cover 18 is preferably provided with a handle 18b. In some cases, the handle 18b is replaced with a flat strap-style handle 18c (FIG. 2) which extends straight across the top of the recess 18d in the top of the cover 18 of sufficient size to accommodate a person's hand. In a typical situation, the food tray 12 is rectangular, measuring 12 inches by 20 inches and is about 8 inches deep.

It will be noted that there is provided a chamber 22 for steam and hot air between the food tray 12 and the sump vessel 14. Chamber 22 includes a lower portion 22a that extends horizontally and an upwardly extending portion 22b which surrounds the containment vessel 12 on all sides. It will thus be seen that the chamber 22 is generally dish-shaped in configuration. It will also be noticed that there are no walls or other barriers between the food tray 12 and sump vessel 14.

In order to provide the required conductivity ratio $K^1/K^2$ between the food tray 12 and the sump vessel 14, the sump vessel 14 has a special composition. The sump vessel 14 is formed from a rigid, monolithic thermosetting plastic resinous body containing a high content (over 15% by weight) of chemically inert particulate mineral filler material. The most preferred filler is metal oxide and/or metal carbonate. The particulate filler can consist either of particles, i.e. a powdered material, or fibers such as glass fibers but is preferably a mixture of both. It is most preferred that the inert mineral filler comprise at least about 30% by weight of the vessel. The balance, typically from about 20% to about 50% by weight of the vessel, is a cured thermosetting plastic resin in which the filler is uniformly distributed. During fabrication, the resin is cured to form the monolithic rigid structure which contains the inert mineral filler. After being cured, the resin is irreversibly converted to a rigid material that will not return to its former plastic condition but instead will char when exposed to high heat.

The resin is preferably relatively heavily loaded with the inert mineral filler particles. In one typical application of the invention utilizing polyester resin that is cured with a peroxide type catalyst, the ratio of filler to resin is about 3 parts to 1 part by weight so that there is in effect about three times as much filler as resin. When a polyester resin is used to form sump vessel 14, the formulation comprises about 72 parts by weight of an inert particulate mineral filler, 22 parts by weight resin and catalyst, and the balance of 6 parts by weight of a mold release and shrinkage reducer. This gives the sump vessel 14 excellent heat insulating qualities, good strength, excellent impact resistance, a high dielectric constant, and a conductivity $K^2$ within the range given below.

The thermal conductivity $K^2$ of the sump vessel 14 should be in the range of about 0.5–3.0 BTU/hr/sq ft/degree F./inch thickness. In one typical example of the invention, the thermal conductivity value $K^2$ of the sump vessel was about 1.3 BTU/hr/sq ft/degree F./inch thickness. Thus, when the food pan is formed from aluminum, the thermal conductivity ratio $K^1/K^2$ is about 1,000. However, if the food pan is formed from stainless steel, $K^1/K^2$ is about 240. It is preferred that the ratio $K^1/K^2$ be at least about 50 and preferably greater than 100. By having a ratio $K^1/K^2$ of at least 50, the sump vessel 14 will provide excellent heat insulating qualities and heat from the heating element 16 will be readily transmitted through the food tray 12 to the food. In addition, infrared radiation will be reflected from the electric heating element 16 toward the food tray 12 containing the food.

The inert mineral filler can comprise particles of any suitable mineral, especially powdered minerals such as clay (magnesium or aluminum silicate), alumina trihydrate ($Al_2O_3 \cdot 3H_2O$), calcium carbonate ($CaCO_3$), titanium dioxide ($TiO_2$), zinc oxide ($ZnO$), fiberglass or silica ($SiO_2$), alumina ($Al_2O_3$), lime ($CaO$), ferric oxide ($Fe_2O_3$), black iron oxide ($Fe_3O_4$), potassium oxide ($K_2O$), phosphorus oxide ($P_2O_5$), magnesium oxide ($MgO$), sodium oxide ($Na_2O$), manganese oxide ($Mn_3O_4$), barium oxide ($BaO$) and the like.

In accordance with the present invention, a highly filled thermosetting resin is especially preferred. To form the sump vessel 14, the filler is wetted with the resin during a preliminary mixing step. When a thermosetting polyester resin is used, a catalyst such as a peroxide catalyst, e.g. tertiary butyl perbenzoate in the amount of about 1 part catalyst for each 15 parts of unsaturated liquid polyester resin, is used. In addition, chips of polyester resin such as a mixture of black and white polyester chips can be used in addition to the liquid polyester resin. The filler comprises at least about 15% by weight and preferably about 30% to 80% by weight of the sump vessel 14. The resin can make up about 20% to 50% by weight of the sump vessel 14 to make a total of 100%. If desired, a minor amount of zinc stearate or other suitable known parting agent can be used to assist in mold release. If desired, a known shrinkage reducing agent such as polyethylene can be used.

The resulting sump vessel has excellent heat insulating qualities, good dielectric strength, and will reflect radiant energy from the electric heating element 16 back to the food tray 12. On the other hand, if the sump vessel is transparent as described in U.S. Pat. No. 3,130,288, much of the radiant heat will be permitted to escape, which is of course unacceptable. The sump vessel 14 also has good impact resistance and low moisture absorption. In addition, the sump vessel 14 has excellent dielectric strength. The dielectric strength S.T., perp., VPM is about 350 volts/mil of thickness (ASTM Test D149). The preferred dielectric strength range is between about 100 and 500 volts/mil of thickness. The side walls and bottom wall of the sump vessel 14 can be about ⅛th inch thick.

While a variety of resin/filler compositions can be employed, two preferred resin/filler compositions are Resin 2203 SMC/LS by Premix Inc. of Kingsville, Ohio or Resin M103 by Industrial Dielectrics of Noblesville, Ind. One preferred composition utilized to form the sump vessel 14 has the following formulation:

| Ingredient | Parts by Weight |
|---|---|
| Polyester resin and catalyst and | 22 |
| (Polyester resin chips, 6 parts; | |
| unsaturated liquid polyester resin, 15 parts; | |
| peroxide catalyst inhibitor, 1 part) | |
| Inert mineral filler particles | 72 |
| ($CaCO_3$, 55 parts; | |
| fiberglass, 15 parts [mixture of | |
| ¼" and ⅛" pieces]; | |
| black fibers, 2 parts) | |
| Shrinkage reduction and mold release agent | 6 |

The resin/filler composition is mixed together as is known in the molding art and formed into a sheet which is cut into pieces that are weighed and placed in molds and molded at elevated temperature, e.g. about 300° F. to 350° F. for a period of 3-5 minutes or until the resin is cured.

In one sump vessel 14 having a wall thickness of ⅛", the thermal conductivity $K^2$ was 2.0 BTU/hr/sq ft/degree F./inch thickness and the dielectric constant at 60 Hz was 5.0-5.4 (ASTM Test D150).

The sump vessel 14 includes four upright side walls 14a-14d, a bottom wall 14e which has upwardly inclined side portions 14f and 14g that help to reflect heat upwardly from an electric heating element 16. The left end of the heating element 16, as shown in the figures, extends through the end wall 19 at the left end of the sump 17 (FIG. 2).

Figure 2:
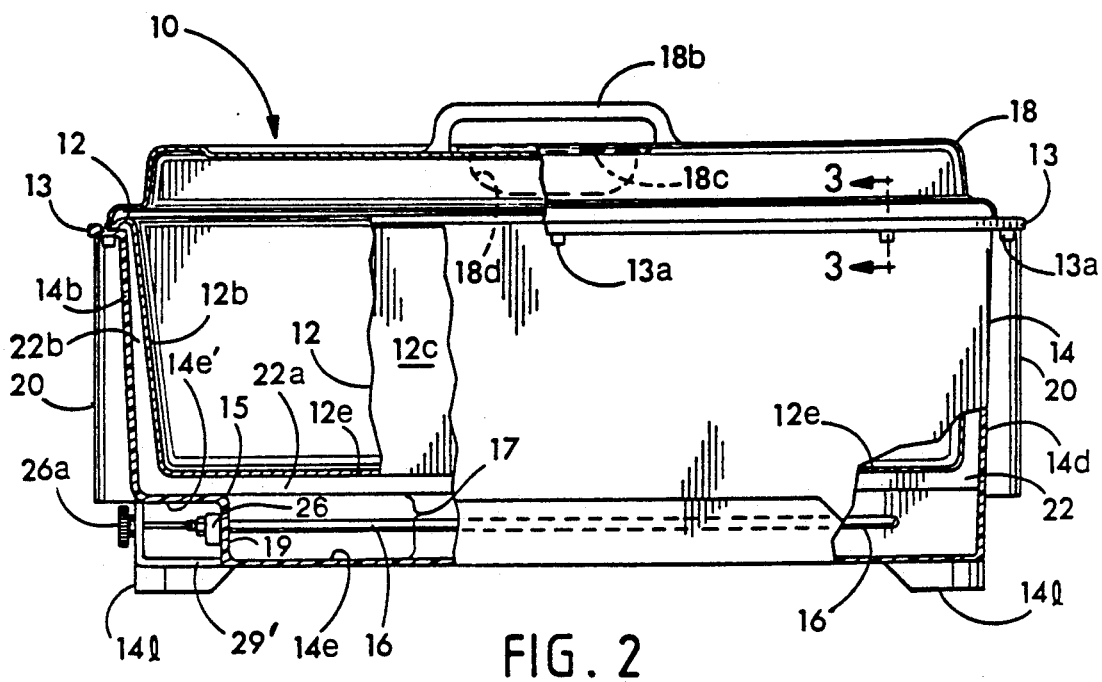
FIG. 2 is a side elevational view of the invention partly in vertical section.
Figure 3:
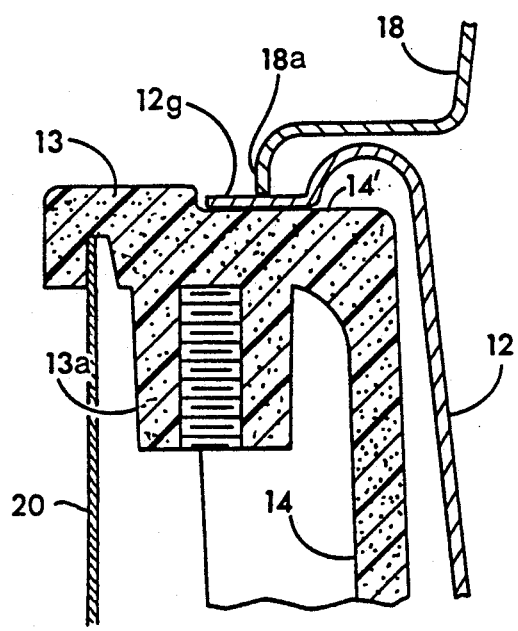
FIG. 3 is an enlarged vertical sectional view taken on line 3—3 of FIG. 2.
Figure 4:
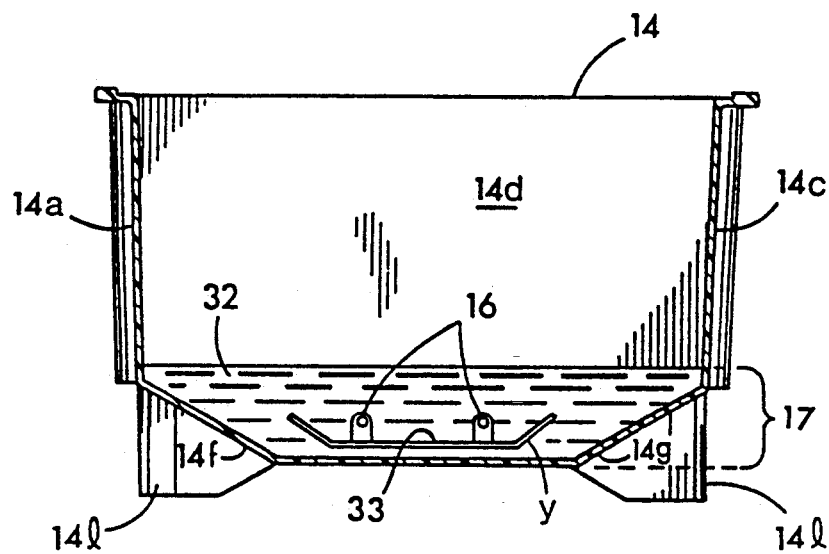
FIG. 4 is a vertical sectional view taken on line 4—4 of FIG. 1 on a reduced scale.
Figure 5:
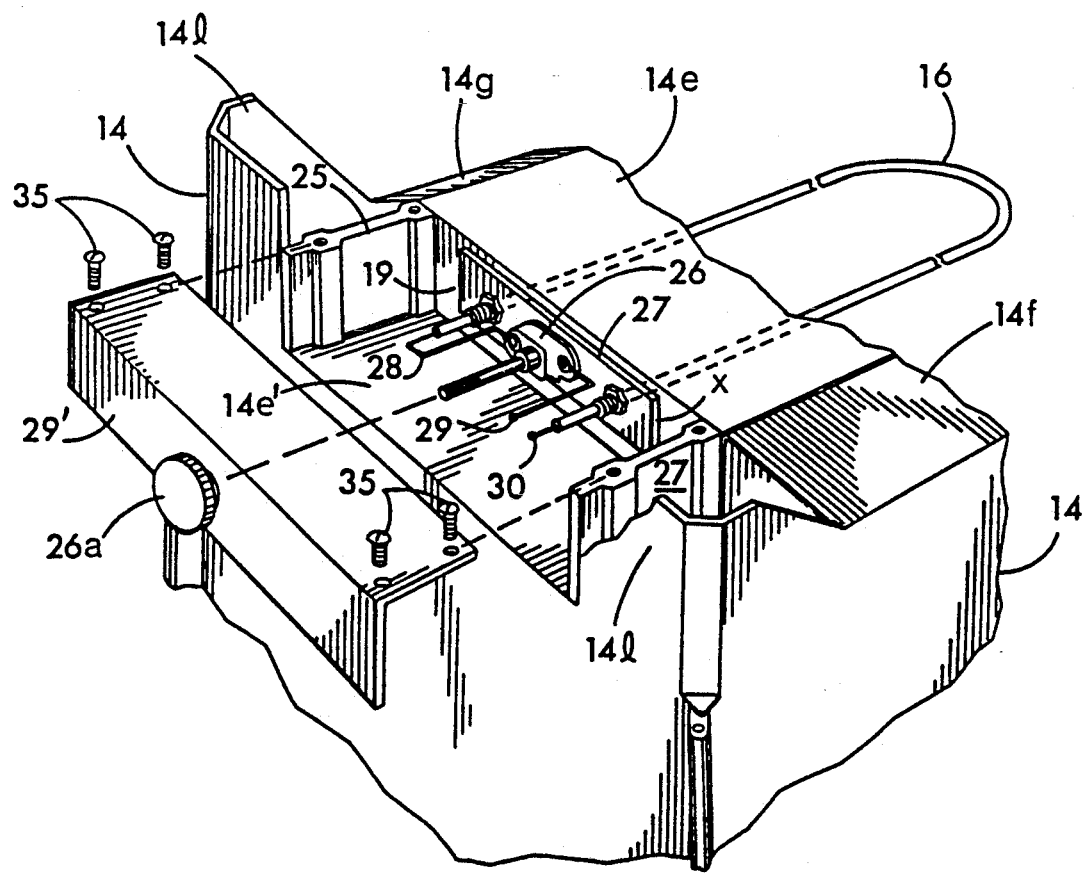
FIG. 5 is a partial perspective view of the invention with a cover removed to show electrical connections.

As shown best in FIGS. 2 and 5, the sump vessel 14 has an indentation 15 (FIG. 2) in the side wall 14b such that the sump vessel 14 has two bottom wall portions 14e and 14e' at different elevations. Portion 14e' is elevated above the relatively deep bottom wall portion 14e so as to define the bottom of a lowered sump chamber 17. The two portions 14e and 14e' of the bottom wall are joined by upright wall 19.

The upright wall 19 can be used for supporting the electric heating element 16. In this way it will be seen that the electric heating element 16 is connected to the upright wall 19 and extends horizontally from it through the sump chamber 17 between the bottom wall 12e of the food containment vessel 12 and the bottom wall 14e of the sump vessel 14.

The indentation 15 bounded by the upper bottom wall 14e' and the upright 19 has a dual function; it defines the lower sump chamber 17 as well as providing a housing or junction box for a thermostat 26, electrical connections 28-30 (FIG. 5) and power supply cord (not shown). The junction box formed by the walls 14e' and 19, as well as end walls 25 and 27, is enclosed by means of a removable cover 29' that is held in place with suitable fasteners such as screws 35.

The thermostat 26 is provided with a special mounting for improving its operation and the overall operation of the apparatus. Specifically, the thermostat 26, the operation of which can be controlled by an adjustment knob 26a, is in heat conductive relationship with the heating element 16 for sensing the temperature of the element. To accomplish this, the thermostat 26 is preferably connected to a heat transfer member 27' (FIG. 5) comprising a metal bar or plate or other heat conductive substance connected at its ends to the heating element 16 for transmitting heat from the electric heating element 16 to the thermostat 26. This arrangement provides good thermal coupling which allows the thermostat 26 to sense temperature changes more quickly, thereby improving the overall operation of the apparatus. The knob 26a is positioned beneath the lower edge of the housing 20 (FIG. 2). Consequently the knob 26a is unlikely to be bumped or tampered with, so as to accidentally change the temperature setting.

During use, water or other heat transfer medium 32 is preferably placed in the sump vessel 14, preferably to a sufficient elevation to completely cover the heating element 16. Thus, during normal operation, the sump vessel 14 is partially filled with water which covers the heating element 16 and contacts the lower aspect (side and bottom walls) of the food tray 12. In this way, heat is transferred from the heating element 16 to the food tray 12 in three ways: by infrared radiation from the heating element 16, by conduction through the water 32, and by convection through currents in the water as well as the convection of vapor which, after being boiled off, strikes the side walls 12a–12d of the food tray 12 condensing and giving up heat. While the invention is preferably operated with water 32 present, it is not essential for its use.

The sump vessel 14 has four integrally formed legs 14L. Since the legs 14L are a part of the sump vessel 14, no extra parts are required to support the sump vessel 14.

The invention has very good thermal efficiency; an efficiency on the order of about 20% better than comparable food warmers previously manufactured by the applicant. This is due in part to the fact that the heating element 16 is located entirely within the well defined by the sump vessel 14 and is spaced between the food tray 12 and the sump vessel 14. No walls or other barriers are present between the heating element 16 and the walls of the food containment vessel 12. As a result, heat will flow more efficiently into the food tray 12 and the food contained therein. Efficiency is increased when water 32 is present to enhance the transfer of the heat to containment vessel 12 by conduction and convection as well as through radiation which normally serves to transfer heat from an electric heating element to a cooler body.

When the sump vessel 14 is formed as described above from a highly filled plastic resin, it will act as a heat insulator to further improve heating efficiency. The location of the heating element 16 in the sump 17 inside the well gives the new warmer other advantages which will now be enumerated.

In the 28 years since U.S. Pat. No. 3,130,288 issued, the product has never seen widespread use in restaurants and cafeterias. The fiberglass filled housing is, however, quite popular even though about 20% to 25% of the energy used in such a food warmer is lost in trying to transfer the heat from the outside of the well to the inside. Substantial losses occur in these warmers when heat is transferred from the heating element through air, then through a heat distribution plate above the heater, and finally through air or water to reach the food tray. The invention eliminates this problem as well as preventing possible damage to the resin from which the sump vessel 14 is formed.

Additionally, in 1993 the Environmental Protection Agency will place fiberglass insulation, in the form used to insulate a standard food warmer, in the same category for disposal as asbestos fibers. Since the highly filled thermosetting plastic sump vessel 14 resists heat damage, it can be used successfully. Because it is a poor thermal conductor and the heating element 16 is inside the well, no added insulation is necessary.

Another advantage of the invention is a provision on the sump vessel 14 for accepting and holding the top edge of the metal enclosure/housing 20, thereby eliminating the need for attachment with screws, blind rivets or by spot welding. It will also be seen that the stepped area including the notch 14' molded into the top of the lip 13 of the plastic well adjacent to the inside upright walls can be used to receive the edge of the pan 12 as shown or an adaptor plate (not shown). This built-in retainer eliminates the necessity for notches or complex edge forms in the adaptor plate itself. The notch 14' molded into the top of the lip of the plastic well also helps to keep moisture that has condensed from escaping from the well and spilling over the side of the warmer.

The sump chamber 17 of the sump vessel 14 adds approximately twice the water capacity of a vessel without such a chamber. The added water capacity is a highly desirable feature because it reduces the number of refills required.

The inclined side portions 14f and 14g of the sump are at a shallow angle to the bottom. The filled thermosetting resin composition of the sump vessel 14 and the inclination of these surfaces helps eliminate heat damage by reflecting infrared radiation toward the food pan 12 if the unit is used dry (without water in the sump vessel 14). The small size of the electrical enclosure eliminates some internal wiring completely and reduces the length of the balance of the wires by approximately 75%. Because neither the control nor the power cord is mounted through the enclosure/housing 20, the housing 20 may be installed last in the assembly procedure, thereby allowing unrestricted assembly of other components.

Attached legs are the most common cause of service problems for all countertop restaurant equipment. Screws loosen, bend or break, causing the need for repair. The legs 14l on the present invention are an integral part of the sump vessel 14. They cannot loosen, do not need installation, and do not have to be purchased as a separate part.

An air chamber between the well 14 and the housing 20 further reduces heat loss. Finally, the protection afforded by the housing 20 prevents the control knob 26a from being damaged during shipment or from being bumped accidentally.

By forming the sump vessel 14 from a unitary dish-shaped container molded of a thermosetting resin heavily loaded with a mineral filler material to provide a rigid monolithic sump body, it is possible to achieve a relationship in which the thermal conductivity $K^1$ of the food pan 12 is over 50 times greater and even 1,000 times greater than the thermal conductivity $K^2$ of the sump vessel 14. This assures outstanding thermal efficiency. The sump vessel 14 also exhibits excellent impact strength and a high dielectric strength, enabling the electric heating element 16 to be supported by a portion of the sump vessel 14; namely, by the wall 19 where it passes through openings within the wall 19 (FIGS. 2 and 5). Thus, the electrical heating element 16 is supported by being cantilevered from a wall of the sump vessel 14 and is in this way held in spaced relationship between the bottom wall of the food pan 12 and the bottom wall 14e of the sump vessel 14 (FIG. 2).

The sump vessel 14 is also nearly impervious to chemical attack, e.g. from electrolytic oxalic acid etch. Moreover, mineral deposits inside the sump vessel 14 can be easily wiped away. Finally, because the sump vessel 14 is not electrically conductive, the unit presents a much lower electric shock hazard than metal.

Many variations of the present invention within the scope of the appended claims will be apparent to those skilled in the art once the principles described above are understood.

What is claimed is:

1. A food warming apparatus for restaurants and cafeterias, comprising:

a food tray having side and bottom walls and an upwardly opening wide mouth, said tray being formed from metal having a thermal conductivity $K^1$ for promoting the conduction of heat to food contained within the tray;

a sump vessel for receiving the food tray, the sump vessel comprising a unitary dish-shaped container having side and bottom walls and an upper open wide mouth;

the food tray is located within the sump vessel with the bottom portion of the food tray spaced within the sump vessel to define a chamber for containing water and steam between the sump vessel and the food tray;

said sump vessel is molded from a filled thermosetting plastic resin containing inert mineral filler particles to provide a rigid monolithic body;

said inert mineral filler particles are distributed through the monolithic body of the sump vessel, said sump vessel has heat insulating qualities and a thermal conductivity $K^2$ to provide a conductivity differential wherein $K^1/K^2$ is at least 50 to reduce heat loss and promote the transmission of heat to the food tray;

an electric heating element positioned between the walls of the sump vessel and the walls of the food tray for heating the food within the food tray when the heating element is energized; and the heating element passing through an opening in a wall of the sump vessel and being connected to said wall, and said heating element is positioned above a bottom wall of the sump vessel and below said food tray.

2. The food warming apparatus of claim 1 wherein the electric heating element is cantilevered from a point where it passes through the wall of the sump vessel.

3. The food warming apparatus of claim 1 wherein the sump vessel comprises a rigid monolithic molded body of between about 30% to about 80% by weight of the particulate mineral filler and between about 20% to about 50% by weight of the thermosetting plastic resin.

4. The food warming apparatus of claim 3 wherein the particulate mineral filler comprises a combination of a mineral powder and fiberglass particles.

5. The food warming apparatus of claim 1 wherein the sump vessel comprises about 20% to 25% percent by weight of a thermosetting polyester resin and about 30% to 80% by weight of an inert mineral filler.

6. The food warming apparatus of claim 1 wherein the thermosetting plastic resin contains at least about 15% by weight of said inert mineral filler particles.

7. A food warming apparatus for restaurants and cafeterias, comprising:

a food tray formed from a heat conductive metal having sides, bottom and an upper open wide mouth positioned to open upwardly at the top of the vessel for holding food that is to be heated;

a hollow, rigid, unitary molded monolithic thermosetting heat-insulating resinous sump vessel containing an inert mineral filler, said vessel having side and bottom walls and having an upper open wide mouth;

the food tray rests within the rigid sump vessel;

said sump vessel is adapted to hold water as a heat transfer liquid;

said sump vessel is constructed and arranged to have its side and bottom walls spaced apart from and larger than the food tray so as to provide a generally dish-shaped chamber between the sump vessel and the food tray for containing hot vapor boiled off within the sump vessel such that an outer surface of the food tray is exposed directly to said hot vapor;

said chamber is bounded on the inside by the heat conductive metal food tray and on the outside by the rigid heat-insulating side wall of the sump vessel;

said sump vessel provides a thermal barrier for directing the flow of heat from within the sump vessel inwardly through the food tray to food therein and the chamber contains heated heat transfer liquid and hot, boiled-off vapor in contact with the outer surface of the food tray;

an electrical heating element in the sump vessel between a wall of the food tray and a wall of the sump vessel for heating the heat transfer liquid and the food tray;

the electric heating element extends into the sump chamber through a hole in the wall of the sump vessel and is supported above the bottom of the sump vessel in a position to be submerged below the surface of the water when the sump vessel is filled with water for producing the hot vapor to directly contact the sides and bottom of the food tray.

8. The food warmer of claim 7 wherein the particulate filler int he body of the sump vessel give the sump vessel a thermal conductivity $K^2$ and the metal food tray has a higher thermal conductivity $K^1$ such that the ratio $K^1/K^2$ is at least 50.

9. The food warmer of claim 7 wherein the particulate filler in the body of the sump vessel gives the sump vessel a thermal conductivity $K^2$ and the metal food tray has a higher thermal conductivity $K^1$ such that the ratio $K^1/K^2$ is at least 200.

10. The food warmer of claim 7 wherein the sump vessel comprises about 30% to 80% by weight of a particulate mineral filler.

11. The sump vessel of claim 10 wherein the particulate mineral filler includes fiberglass.

12. The sump vessel of claim 10 wherein the particulate mineral filler comprises a mixture of calcium carbonate ($CaCO_3$) and fiberglass.

* * * * *